US006483695B1

(12) United States Patent
Hartstein

(10) Patent No.: US 6,483,695 B1
(45) Date of Patent: Nov. 19, 2002

(54) COMPUTER/KEYBOARD BUILT INTO REFRIGERATOR DOOR

(76) Inventor: Stanley Hartstein, 1948 E. 9th St., Brooklyn, NY (US) 11223

( * ) Notice: Subject to any disclaimer, the term of this patent is extended or adjusted under 35 U.S.C. 154(b) by 890 days.

(21) Appl. No.: 08/671,114

(22) Filed: Jun. 24, 1996

(51) Int. Cl.[7] .......................... G06F 1/16; F25B 49/00; F25D 15/00

(52) U.S. Cl. ........................ 361/680; 361/681; 62/126; 62/231; 62/331

(58) Field of Search ....................... 381/42; 364/705.01, 364/188, 400; 62/115, 125, 126, 231, 331; 312/237; 395/148; 434/112; 345/168; 340/585; 361/680, 681

(56) References Cited

U.S. PATENT DOCUMENTS

| | | | | | |
|---|---|---|---|---|---|
| 3,836,221 | A | * | 9/1974 | Whistler, Jr. et al. | 312/237 |
| 4,148,194 | A | * | 4/1979 | Kells | 62/3 |
| 4,703,423 | A | * | 10/1987 | Bado et al. | 364/400 |
| 4,776,016 | A | * | 10/1988 | Hansen | 381/42 |
| 4,966,004 | A | * | 10/1990 | Midlang et al. | 62/77 |
| 4,970,870 | A | * | 11/1990 | Midlang et al. | 62/126 |
| 5,169,342 | A | * | 12/1992 | Steele et al. | 434/112 |
| 5,208,745 | A | * | 5/1993 | Quentin et al. | 364/188 |
| 5,237,651 | A | * | 8/1993 | Randall | 395/148 |
| 5,424,720 | A | * | 6/1995 | Kirkpatrick | 340/585 |
| 5,479,192 | A | * | 12/1995 | Carroll, Jr. et al. | 345/168 |
| 5,487,276 | A | * | 1/1996 | Namisniak et al. | 62/125 |
| 5,524,444 | A | * | 6/1996 | Gromala et al. | 62/115 |
| 5,583,965 | A | * | 12/1996 | Douma et al. | 395/2.84 |

* cited by examiner

*Primary Examiner*—Emmanuel L. Moise
(74) *Attorney, Agent, or Firm*—Ostrolenk, Faber, Gerb & Soffen, LLP

(57) ABSTRACT

The invention comprises a refrigerator-based, computer task controller and a corresponding method. The task controller includes a refrigerator with a refrigerator door which defines a recessed well in which a laptop sized computer is housed. The recessed well has a size and shape which complements and matches the corresponding size and shape of the laptop computer. An operator interacts with the computer which is located at standing height above ground level to command and direct the computer to perform one or more of a plurality of software controlled functional tasks, wherein each task is controlled by a software program associated with that task which is resident in the computer.

20 Claims, 6 Drawing Sheets

COMPUTER/KEYBOARD BUILT INTO REFRIGERATOR DOOR

BACKGROUND OF THE INVENTION

The present invention generally relates to refrigerators and more particularly to a household refrigerator which is combined with and supports a laptop sized computer which can be used for a variety of tasks such as for displaying and controlling the refrigerator temperature, displaying recipes, acting as a reminder system and as a telephone directory and the like.

Although computers have come into widespread use in the home and office, they are not typically found in people's kitchens where counter space is often quite tight. This is regrettable, since computers can be quite helpful in and around kitchens.

Relatively old prior art describes the expedient of incorporating a radio appliance within a refrigerator door. For example, U.S. Pat. No. 3,836,221 which issued in 1974 describes a special housing installed within an opening in a refrigerator door which removably accommodates a radio appliance. U.S. Pat. No. 2,795,639 which issued to Rawson in 1957 describes another refrigerator door embodiment which houses a radio "for entertaining the housewife while she is about her chores in the kitchen." More recently, in 1986, U.S. Pat. No. 4,571,740 issued for a radio incorporated in a recreational type ice chest. While radios, television sets, and similar passive, visual and audio entertainment appliances have been known to be installed everywhere in people's homes, the idea of installing an interactive computer within the kitchen area of a home, and particularly within a refrigerator door, has thus far eluded the prior art.

SUMMARY OF THE INVENTION

Accordingly, it is an object of the present invention to provide an arrangement which makes a computer accessible within the kitchen area of a home.

It is another object of the present invention to provide within the kitchen, more specifically mounted within a refrigerator door, a computer that is programmed to perform a variety of tasks which are particularly suited for use by persons working in and around a home kitchen.

It is yet another object of the present invention to provide a computer system mounted within a refrigerator door which incorporates a variety of useful functions and hardware.

The foregoing and other objects of the invention are realized by the present invention by means of a special refrigerator door which is provided with a special recess for mounting therein a laptop sized computer which includes a keyboard, for providing interactive control to perform and realize a variety of functions. By way of example, the computer system of the present invention includes the means for displaying and setting the temperature both within the refrigerator and freezer compartments of the refrigerator. Another function comprises a computer implemented reminder system for both the displaying and optionally annunciating various messages. The computer also serves as a telephone directory. It enables the storage of telephone numbers and the display or (optional) annunciation of telephone numbers. Another important function includes the entry and storage within the computer of a variety of menus/recipes for the preparation of foods.

Other features and advantages of the present invention will become apparent from the following description of the invention which refers to the accompanying drawings.

DETAILED DESCRIPTION OF EMBODIMENTS OF THE INVENTION

Figure 1:
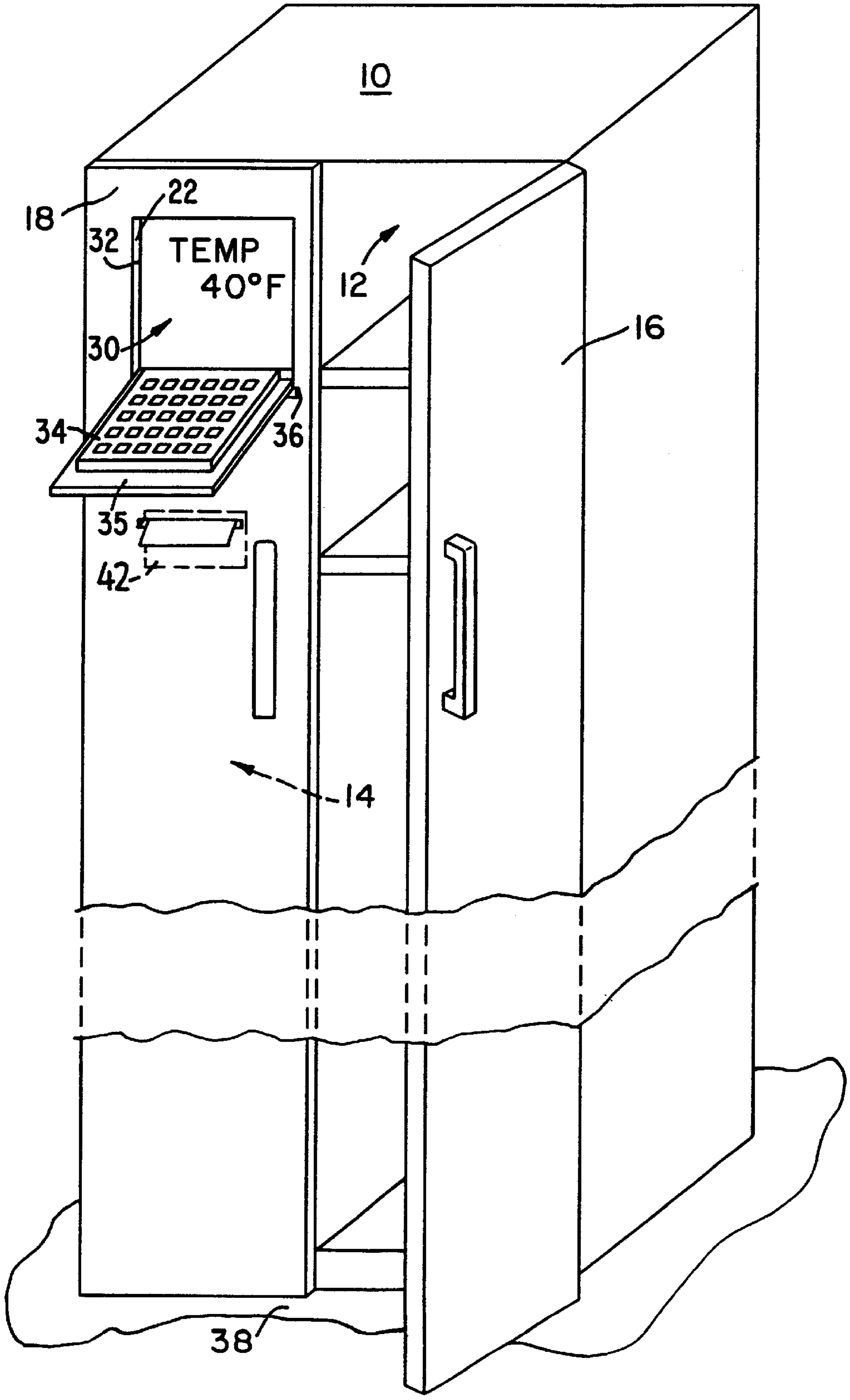
FIG. 1 is a perspective showing a refrigerator with a computer mounted in its door with a hingedly connected keyboard displayed in the open portion.

The otherwise conventional refrigerator 10 of FIG. 1 comprises in well known manner a refrigerator compartment 12, a freezer compartment 14, and respective doors 16 and 18 to seal off these compartments. The refrigerator 10 in FIG. 1 is a side-by-side refrigerator. In contrast, the refrigerator 20 in FIG. 2*a* is a top-bottom refrigerator with the freezer compartment at the top.

In either case, these refrigerators 10 and 20 include in accordance with the present invention, a computer system which is either housed in or mounted to one of the refrigerator doors. In FIG. 1, the left hand refrigerator door 18 defines a recessed well 22 which is about 2 to 4 inches deep and which contains various conventional hardware (not shown) for securely holding the computer system 30 therein. Alternatively, as shown in FIG. 2*a*, the computer system can be supported on the exterior surface 24 of the refrigerator door.

In FIG. 1, the computer system 30 is a laptop style computer which has a first compartment 32 which contains the screen and which is located inside the recessed well 22. Hingedly connected to it is the keyboard 34 which is shown in its swung open position and which can optionally rest against the supporting ledge 36 at the bottom of the recessed well 22 for providing just the correct angle for comfortably typing instructions or commands into the computer. Preferably, the height of the computer is at from 4 to 5½ feet above ground level 38.

Figure 2:
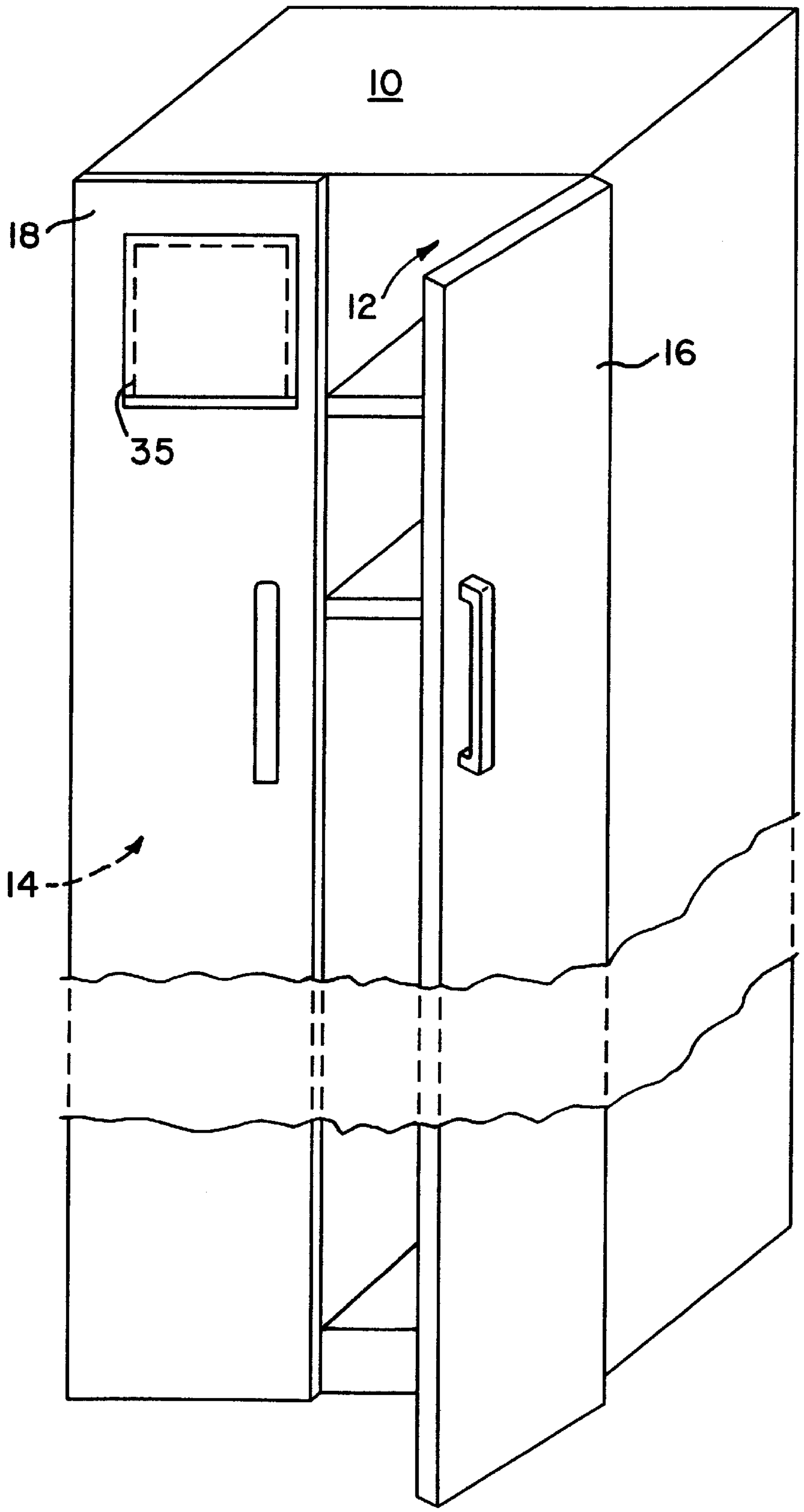
FIG. 2 shows the invention of FIG. 1 with the keyboard closed so that the computer blends into the refrigerator door to provide an unobtrusive, common refrigerator door appearance.
Figure 2A:
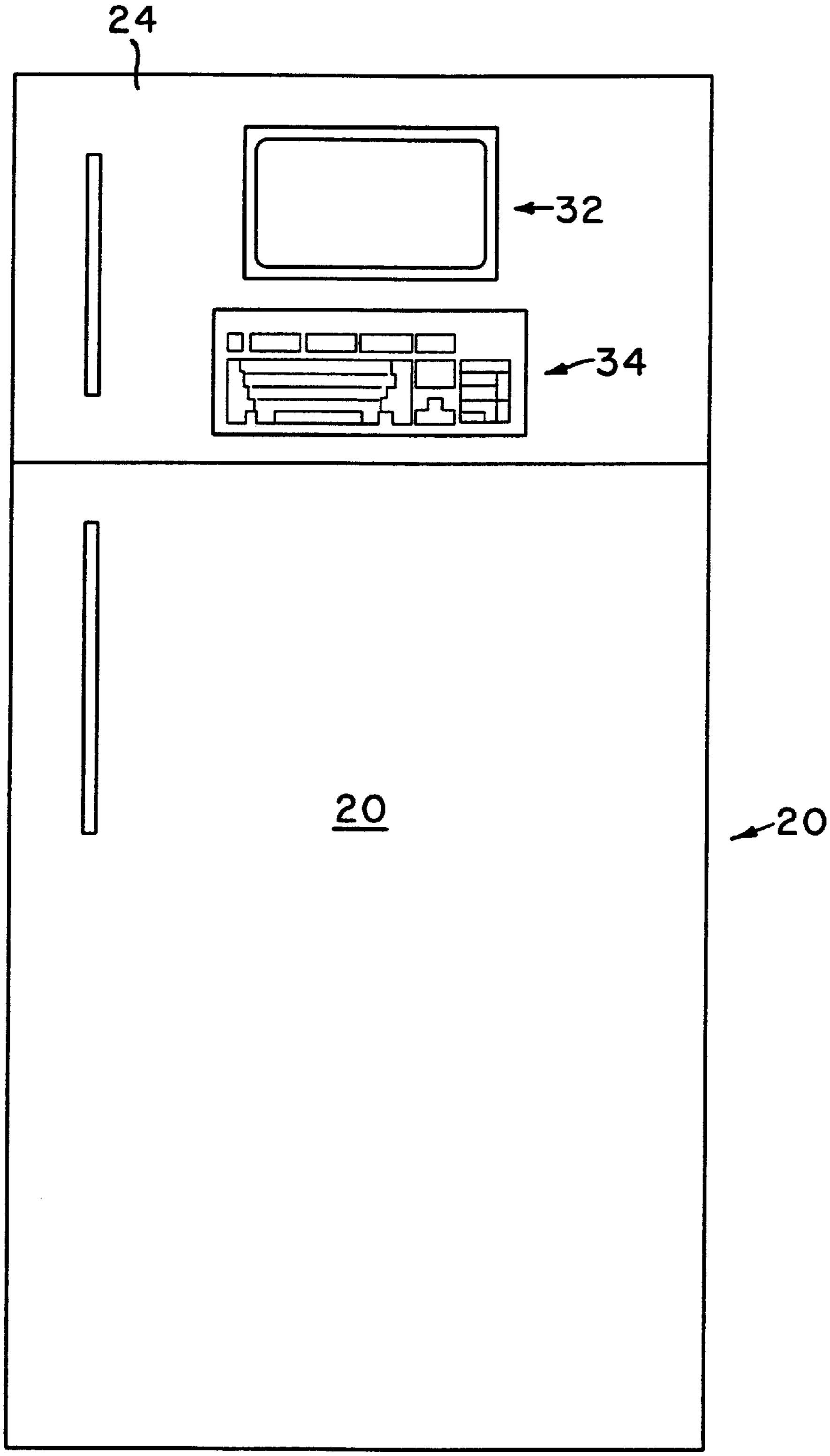
FIG. 2*a* shows a stationarily mounted keyboard.

FIG. 2 further shows a covering 35 in a form of a flexible membrane or the like that is adhesively or otherwise secured to the bottom side of the keyboard 34, so that when the keyboard is in a closed position, the entire computer is concealed from view for improving the aesthetics of the refrigerator. The invention also includes the option of providing a separate, narrow width printer 42 which can be housed by being mounted to the door or in its own cavity in the refrigerator. Such a printer 42 is intended to be interfaced with the computer 30 to provide a printout of lists of chores to do, messages, recipes and the like.

Figure 3:
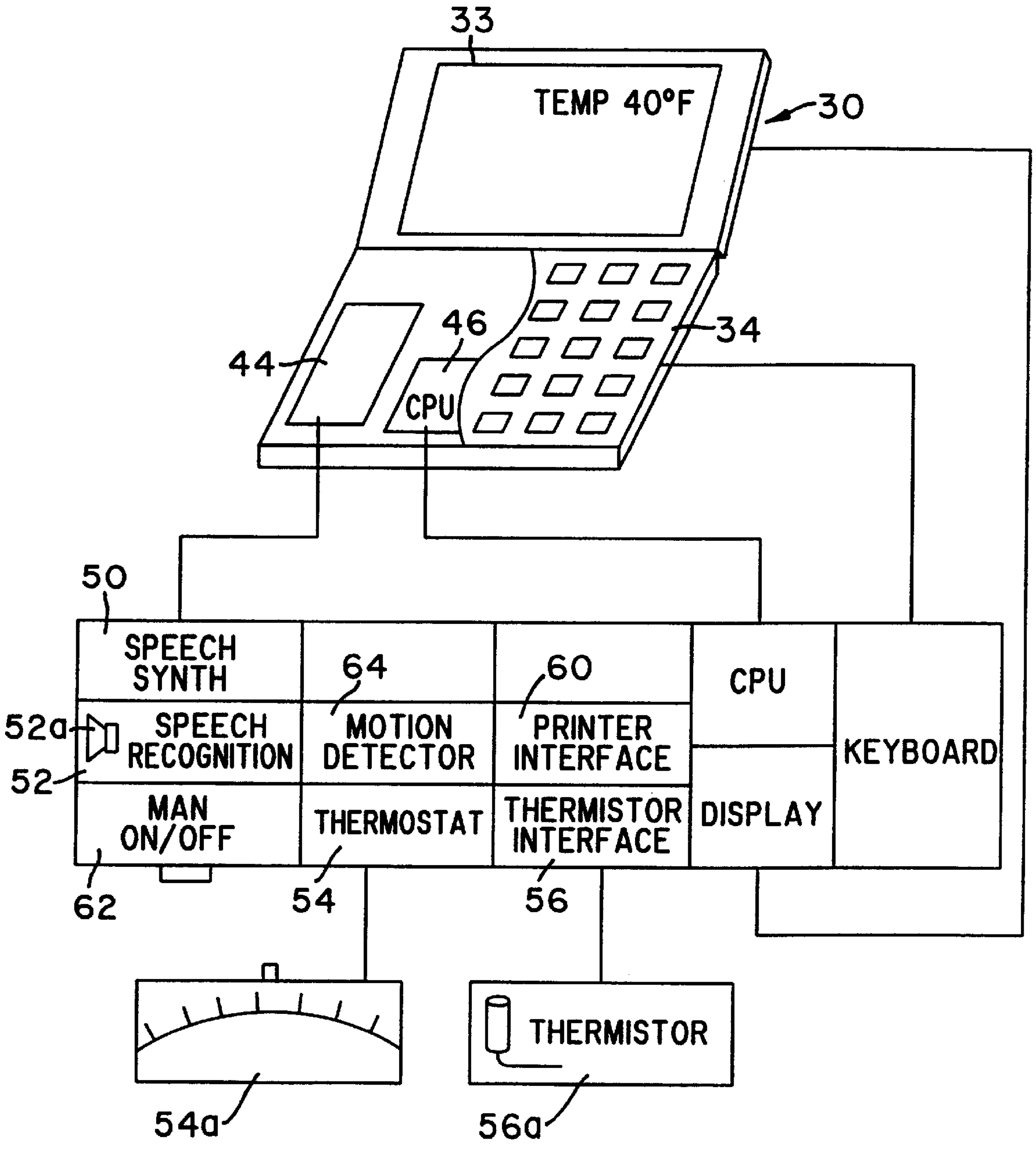
FIG. 3 is a schematic of the main electrical systems of the computer of the present invention.

Turning to FIG. 3, the computer portion of the present invention includes an otherwise conventional computer 30, for example a laptop computer, which includes a first panel containing the screen 33 and a second panel which contains the keyboard 34 and CPU 46. The invention preferably also includes an auxiliary board 44 which can be provided separately of the keyboard/screen (not shown) or within the keyboard compartment, as shown.

In any event, as indicated by the connecting lines in the figure, the keyboard circuit communicates with the CPU which also controls the display section 32, and the auxiliary board 44.

The auxiliary board 44 may include one or all of the following special sections or components (among others). These include a conventional speech synthesizer circuit 50 which is capable of annunciating various messages stored as words in memory as for example, sequential recipe steps, ingredient lists, typed messages, etc. Another section of the auxiliary board comprises a speech recognition circuit 52 including a microphone 52*a*, which is programmed to recognize spoken commands in the form of simple words such as: REPEAT, CONTINUE, YES, NO, and the like.

Yet another circuit section comprises a thermostat control interface 54 which enables the computer to set an external thermostat 54*a* to a desired position to cause the compressor of the refrigerator to establish a desired temperature. A related section 56 comprises the temperature sensor interface for one or more temperature sensing elements such as thermocoupler(s) 56*a* which may be located in the refrigerator and freezer compartments. These devices 56*a* provide an electrical signal (not illustrated) which is suitably digitized (as by an analog to digital converter) to provide the CPU 46 with a numerical value indicative of the actual temperature within the refrigerator and freezer compartments. In response, the CPU may also adjust the thermostat setting to ensure that the requested temperature has been properly established within the refrigerator.

If the aforementioned printer 42 is included, a printer interface section 60 serves to facilitate the printing of desired information. The auxiliary board also may house a manual switch 62 which serves to turn on power to the computer located in the recess 22 through an electrical line (not shown).

Thus, power may be turned on manually via the manual switch 62. Alternatively, the auxiliary board 44 may also provide a motion sensor 64, such as an IR sensor which senses the movement of persons in and about the kitchen area, so that in response, a relay switch becomes activated to provide electrical power to the CPU, so that the program residing therein begins executing in a manner which will be described below. In any event, the movement sensor provides a signal to the computer and the computer will remain on for a predetermined time period after the movement has stopped at which time the computer could turn itself off. Note that the instant invention also encompasses providing a telephone connection (not shown) in the recess 22 to enable communication, e.g. e-mail, internet, etc., if desired. Other functions, tasks, and benefits of the system of the present invention will now be described by reference to the overall, top level software flowchart presented in FIG. 4.

Figure 4A:
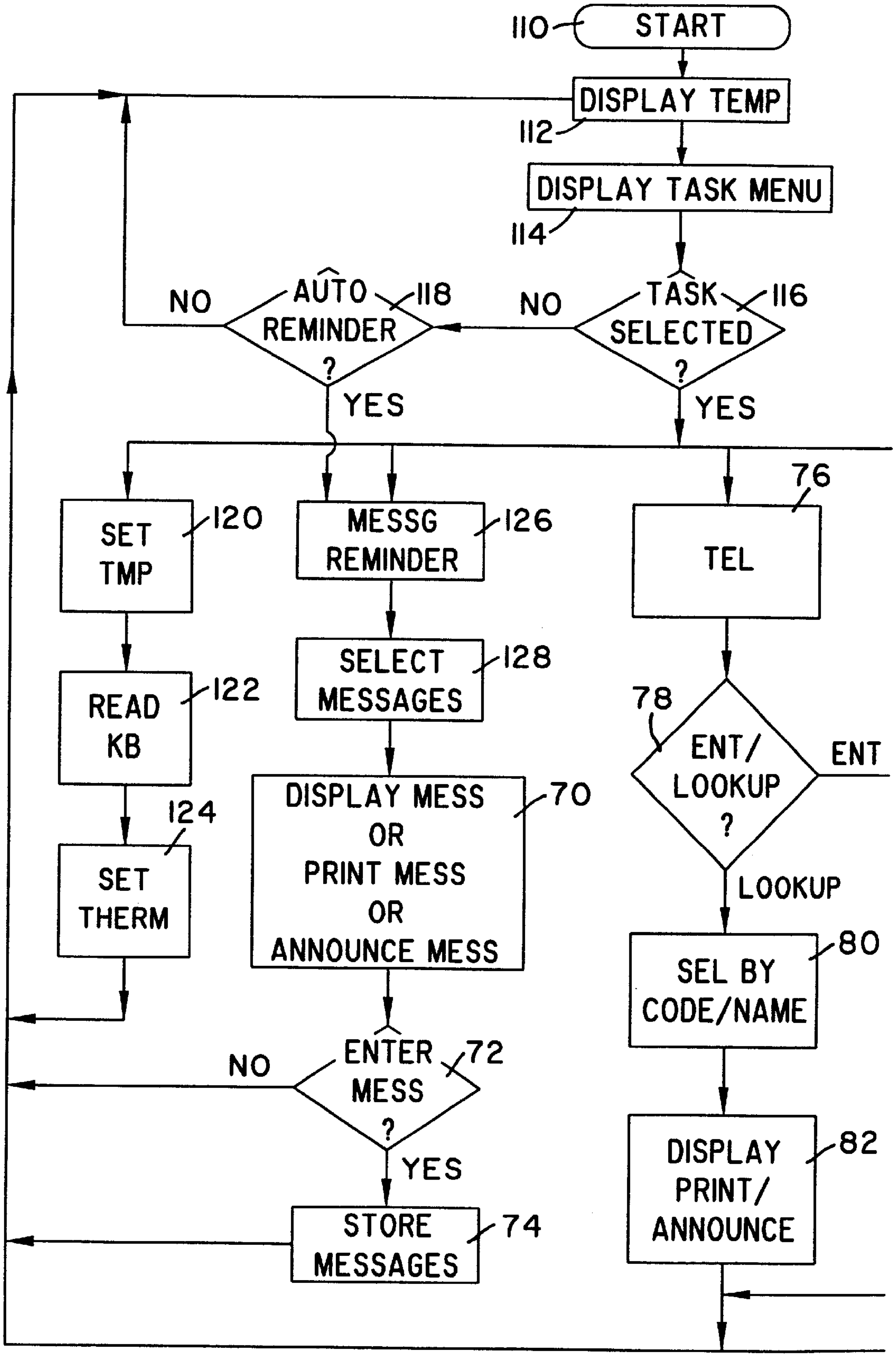
FIG. 4 is a block diagram of various software routines performed within the refrigerator mounted computer of the present invention.
Figure 4B:
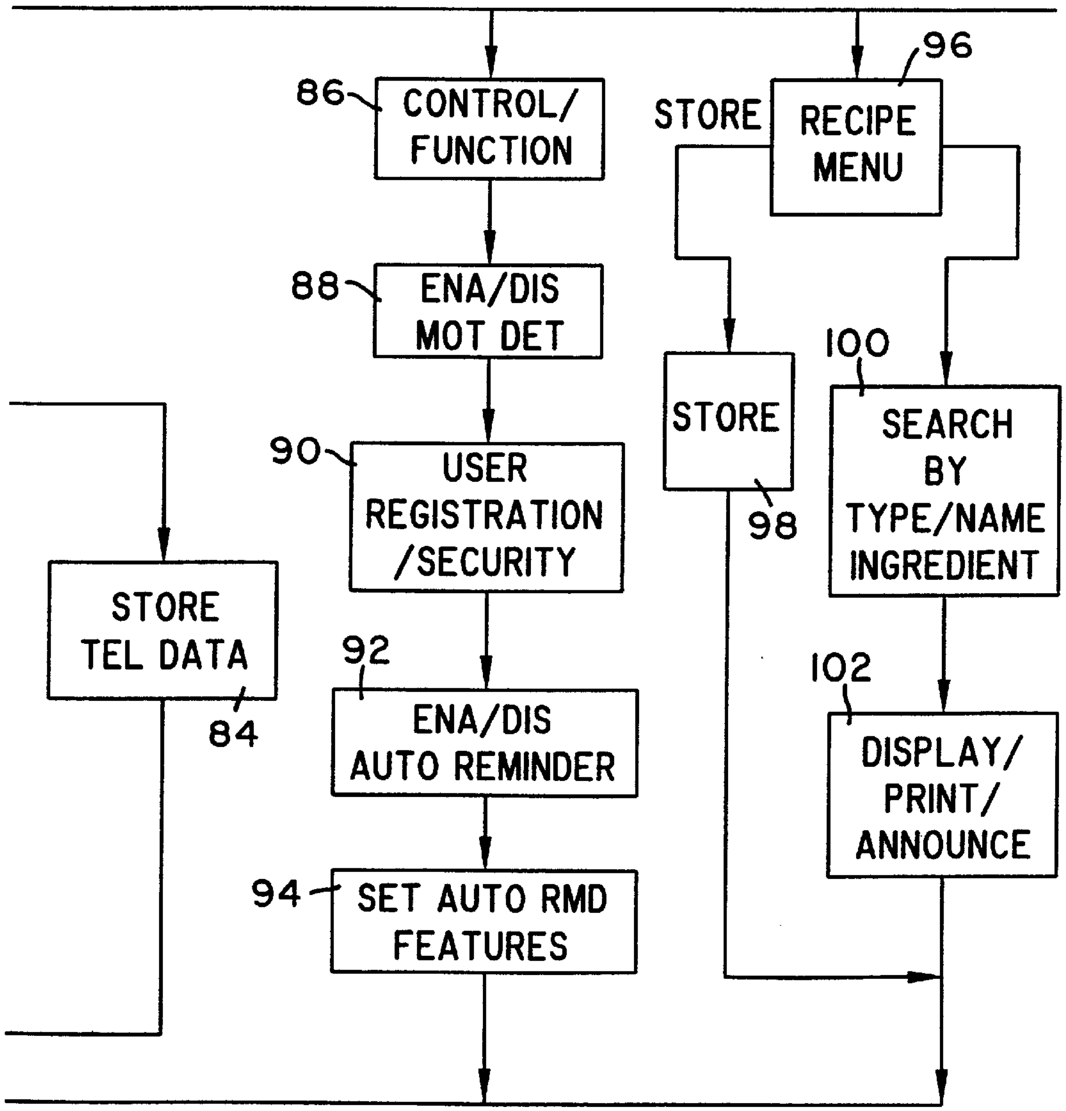

With reference to FIG. 4, several of the various software routines incorporated into the computer system for the purpose of effectuating the tasks of the present invention are displayed in a simplified, top level block diagram. The program starts with block 110 which, upon pressing of the reset button or application of power to the computer, proceed to initialize the various internal registers, memories, etc. of this system in known matter. The program then proceeds to the step 112 at which point the computer displays the temperature as it is calculated from the input provided by thermistor(s) 56*a*. The display can be for example located in the upper right hand corner of the screen 33 in the following format:

Refrigerator Temperature 40° F.

Freezer Temperature 25° F.

Thereafter, the program proceeds to block 114 where the program displays on the screen 33 the various tasks that can be carried out with the system. The system then awaits a response in the decision block 116. If no response is provided within a set period of time, the program proceeds to the block 118 to determine whether the auto reminder feature has been set in the software. If it has not, it returns to the display temperature block 112. If the auto reminder feature has been set, the program proceeds to the message reminder block 126 where it automatically retrieves various messages left for the user that has signed on the system, selects the messages for the particular user (or all messages as the case may be) at block 128 and then proceeds to block 70 where the program either displays the message(s) on the screen, or prints the message(s) at the printer 42 (if so programmed) or (where that feature has been selected) the message(s) are played back audibly by means of the speech synthesizer 50 (FIG. 3).

If, at the task selection block 116, the user has selected the option of entering a message, the program will proceed to the block 72 where the operator is given the opportunity to key in a message (or several messages), including various playback parameters associated with those messages, such as when those messages should be played back, e.g. date and/or time of day, whether the messages should be repeated several times, etc. Once the messages have been stored at block 74, the program returns to the display temperature block 112 and the process repeats as above. If no storage of messages has been requested, the program proceeds from the block 72 to the display temperature routine at block 112.

Returning to the task selection decisional block 116, if the task selected was to set a particular temperature, the program proceeds to block 120 where the computer awaits at block 122 an input from the keyboard and then stores that input in an memory. It then sets the thermostat 54*a* to a setting that will produce the desired temperature. Thermostat 54*a* can be of a type which is electronically programmed or it can be a thermostat which has electrically controlled movable parts which set a bi-metallic component or a coiled metal to control the refrigerator compressor to maintain a particular temperature. The program then returns to the display temperature block 112.

When the user has selected the telephone option, the program proceeds to block 76 and then to the decisional block 78 to determine whether the operator desires to store telephone data, e.g. telephone numbers, names, addresses, etc. at block 84. Alternatively, the program proceeds to the lookup block 80 where the user is permitted to type in the name of an individual or a code, etc., to which the program responds by proceeding to block 82 where the corresponding telephone number (or the address and other information) is either displayed, printed or verbally annunciated.

As an option, the commands at block 116 can be received by voice, via the speech recognition hardware 52. Thus, the present invention allows one to communicate with the computer by issuing simple voice commands such as "TELEPHONE" which can be recognized at the task selection block 116. If a code number is then annunciated to identify a particular party, the computer will respond by annunciating the corresponding telephone number. This enables telephone dialing without having to leave ones comfortable chair or while going about one's work in the kitchen area.

Another of the available tasks is to set up various control/condition parameters for running the system by proceeding to block 86. Thus, the block 88 enables or disables the motion detector 64 (FIG. 3). As previously explained, the motion detector 64, when enabled, sets a signal that closes a relay that applies power to the computer system, when people are in the vicinity. If, however, the user has disabled the motion detecting function, the computer is turned on/off solely via the manual switch 62.

Another function involves user registration and security, which is accomplished in the software block 90. Thus, a user can register not only his/her name but also perhaps record his/her name as a voice print, to be recognized through the voice recognition circuit 52 of the system. This enables the computer to selected messages for a given person who simply annunciate his name "Stanley" or "Max", etc. The block 92 allows the operator to enable or disable the auto reminder system. When the Auto reminder is disabled, messages are retrievable only upon a specific request to the computer system. The block 94 allows the user to set various features of the auto reminder system, as for example how often the messages are to be played back, whether messages are to be played back once or repeated several times and/or whether messages should be played each time the presence of a person is detected and power is reapplied to the computer.

Another function involves the storage and retrieval of various food preparation recipes. Thus, if that task is selected, the program proceed to block 96 where a decision is made whether the user is interested in storing a new recipe, whereupon the storage of such recipe is executed in block 98. Alternatively, at block 100 the user is provided with the opportunity of either reviewing the names of various recipes or searching the database by typing in the type of dishes or foods that the user is interested in as, for example, meat dishes, poultry, desserts, soups, cakes, cookies, etc. to allow the user to select from the recipes in that class of food. Once a class of foods has been selected, all of the various recipes are available, which the user can scroll through. Once a particular recipe has been selected, the program proceeds to block 102 where the program displays or prints the recipe.

Another option is for the program to annunciate the various steps of preparing the particular food. This can proceed as a line-by-line recitation of which ingredients to collect, how to mix them, how long to allow the food mixture to simmer or cook, etc., with the user prompting the computer to proceed at each step by annunciating simple commands such as "BEGIN" for actuating the beginning of a recitation of a recipe, "REPEAT" for repeating a step, or "CONTINUE" to continue, etc.

While certain features of the present invention have been described above with reference to the flowchart of FIG. 4, it should be understood that the range of options is quite great and that the myriad of possibilities cannot be described herein.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A refrigerator and computer combination, comprising:

a refrigerator containing at least one food compartment for the storage of food therein;

a refrigerator door for sealing the at least one food compartment, the door including an interior side facing the compartment and an exterior side;

a recessed well in the refrigerator door at the exterior side thereof and at the height of about 4 to 5½ feet above ground;

a laptop sized, general purpose computer housed in the recessed well, the recessed well having a size and a shape which complements and matches the corresponding size and shape of the laptop computer, the computer including a full alphanumeric keyboard for enabling a user to interact with and control the computer; and the alphanumeric keyboard being effective for enabling a user to direct the computer to perform one or more of a plurality of software controlled functional tasks, wherein each task is controlled by a software program associated with that task which is resident in the computer.

2. The refrigerator and computer combination of claim 1, including at least one thermometer coupled to the computer for sensing an ambient temperature in the refrigerator and including means for displaying the temperature on a screen of the computer.

3. The refrigerator and computer combination of claim 1, further including a computer controlled thermostat coupled to the computer for setting a temperature in the refrigerator.

4. The refrigerator and computer combination of claim 1, further comprising means for storing messages in the computer and playing back the messages in accordance with programmed criteria.

5. The refrigerator and computer combination of claim 1, further comprising means for storing a telephone directory and for outputting telephone information in response to a request of the user.

6. The refrigerator and computer combination of claim 5, further comprising a speech synthesizer coupled to the computer and means for playing back the telephone information through the speech synthesizer to enable audible annunciation of the telephone information.

7. The refrigerator and computer combination of claim 1, further comprising a speech recognition system in the computer and means for enabling the computer to respond to voice commands by the user.

8. The refrigerator and computer combination of claim 1, further comprising means for storing and outputting food preparation recipes.

9. The refrigerator and computer combination of claim 8, further comprising means for outputting a recipe menu for selecting therefrom various food recipes.

10. The refrigerator and computer combination of claim 9, wherein the means for outputting a recipe menu comprises displaying recipes on the computer screen.

11. The refrigerator and computer combination of claim 9, wherein the means for outputting a recipe comprises printing the recipes.

12. The refrigerator and computer combination of claim 9, wherein the means for outputting a recipe comprises means for audibly annunciating various recipe steps.

13. A method for executing various tasks by means of a refrigerator-based general purpose computer, the steps comprising:

providing a refrigerator containing at least one food compartment for the storage of food therein;

providing a refrigerator door for sealing at the at least one food compartment, the door including an interior side facing the compartment and an exterior side;

providing a recessed well in the refrigerator door at the exterior side thereof and at a height of about 4–5½ feet above ground;

providing a laptop sized, general purpose computer housed in the recessed well, the recessed well having a size and shape which complements and matches the corresponding size and shape of the laptop computer, the computer including a full alphanumeric keyboard for enabling a user to interface with the computer; and controlling the alphanumeric keyboard to direct the computer to perform one or more of a plurality of software controlled tasks, wherein each task is controlled by a software program associated with that task which is resident in the computer.

14. The method of claim 13, including inputting a temperature setting into the computer to enable the computer to control a thermostat.

15. The method of claim 13, further including inputting messages into the computer to enable the computer to play back those messages in accordance with predetermined criteria.

16. The method of claim 13, further including inputting into the computer a telephone directory to enable the computer to play back telephone numbers.

17. The method of claim 13, further including playing back information stored in the computer through voice enunciation.

18. The method of claim 13, further including entering and storing in the computer a plurality of recipes to enable the computer to play back recipes upon request of a user.

19. The method of claim 13, further comprising communicating with the computer through voice commands.

20. The method of claim 13, further comprising providing the computer with a motion detector and enabling the computer for operation in response to movements of objects in and about the refrigerator.

* * * * *